United States Patent [19]

Inagami et al.

[11] Patent Number: 5,530,881
[45] Date of Patent: Jun. 25, 1996

[54] VECTOR PROCESSING APPARATUS FOR PROCESSING DIFFERENT INSTRUCTION SET ARCHITECTURES CORRESPONDING TO MINGLED-TYPE PROGRAMS AND SEPARATE-TYPE PROGRAMS

[75] Inventors: Yasuhiro Inagami, Kodaira; Teruo Tanaka, Hachioji; Yoshiko Tamaki, Kodaira; Katsuyoshi Kitai, Hadano; Tadayuki Sakakibara, Kunitachi, all of Japan

[73] Assignee: Hitachi, Ltd., Tokyo, Japan

[21] Appl. No.: 894,633

[22] Filed: Jun. 5, 1992

[30] Foreign Application Priority Data

Jun. 6, 1991 [JP] Japan .................................. 3-134731

[51] Int. Cl.$^6$ ........................................ G06F 9/30
[52] U.S. Cl. ...................... 395/800; 395/375; 364/231.8; 364/232.21
[58] Field of Search ...................... 395/375, 800

[56] References Cited

U.S. PATENT DOCUMENTS

| | | | |
|---|---|---|---|
| 4,128,880 | 12/1978 | Cray, Jr. | 395/800 |
| 4,541,046 | 9/1985 | Nagashima et al. | 395/375 |
| 4,617,625 | 10/1986 | Nagashima et al. | 395/800 |
| 4,780,811 | 10/1988 | Aoyama et al. | 395/800 |
| 4,964,035 | 10/1990 | Aoyama et al. | 395/800 |
| 5,001,627 | 3/1991 | Sakamoto | 395/375 |
| 5,073,970 | 12/1991 | Aoyama et al. | 395/800 |
| 5,113,521 | 5/1992 | McKeen et al. | 395/650 |
| 5,247,691 | 9/1993 | Sakai | 395/800 |
| 5,319,791 | 6/1994 | Williams et al. | 395/800 |

FOREIGN PATENT DOCUMENTS 61-131169 6/1986 Japan .

OTHER PUBLICATIONS

Kawabe et al., "The Single Vector Engine Supercomputer S-820 Delivers", Nikkei-McGraw Hill, Inc., Dec. 28, 1987.

Primary Examiner—Krisna Lim
Attorney, Agent, or Firm—Antonelli, Terry, Stout & Kraus

[57] ABSTRACT

A vector processor system for processing vector instructions and scaler instructions fetched from storages includes a memory storage, a first and a second scaler processing units connected to the memory storage, a vector processing unit being connected to the memory storage and the two scaler processing units and for processing a vector instruction fetched from the memory storage during processing of scaler instruction/vector instruction separate type programs and a vector instruction received from the second scaler processing unit during processing of scaler instruction/vector instruction mingled type programs. More particularly, for scaler instruction/vector instruction mingled type programs, the vector processing unit receives the vector instruction from the scaler processing unit, whereas for scaler instruction/vector instruction separate type programs, the vector processing unit retrieves the vector instruction directly from the memory storage.

12 Claims, 4 Drawing Sheets

F I G. 1
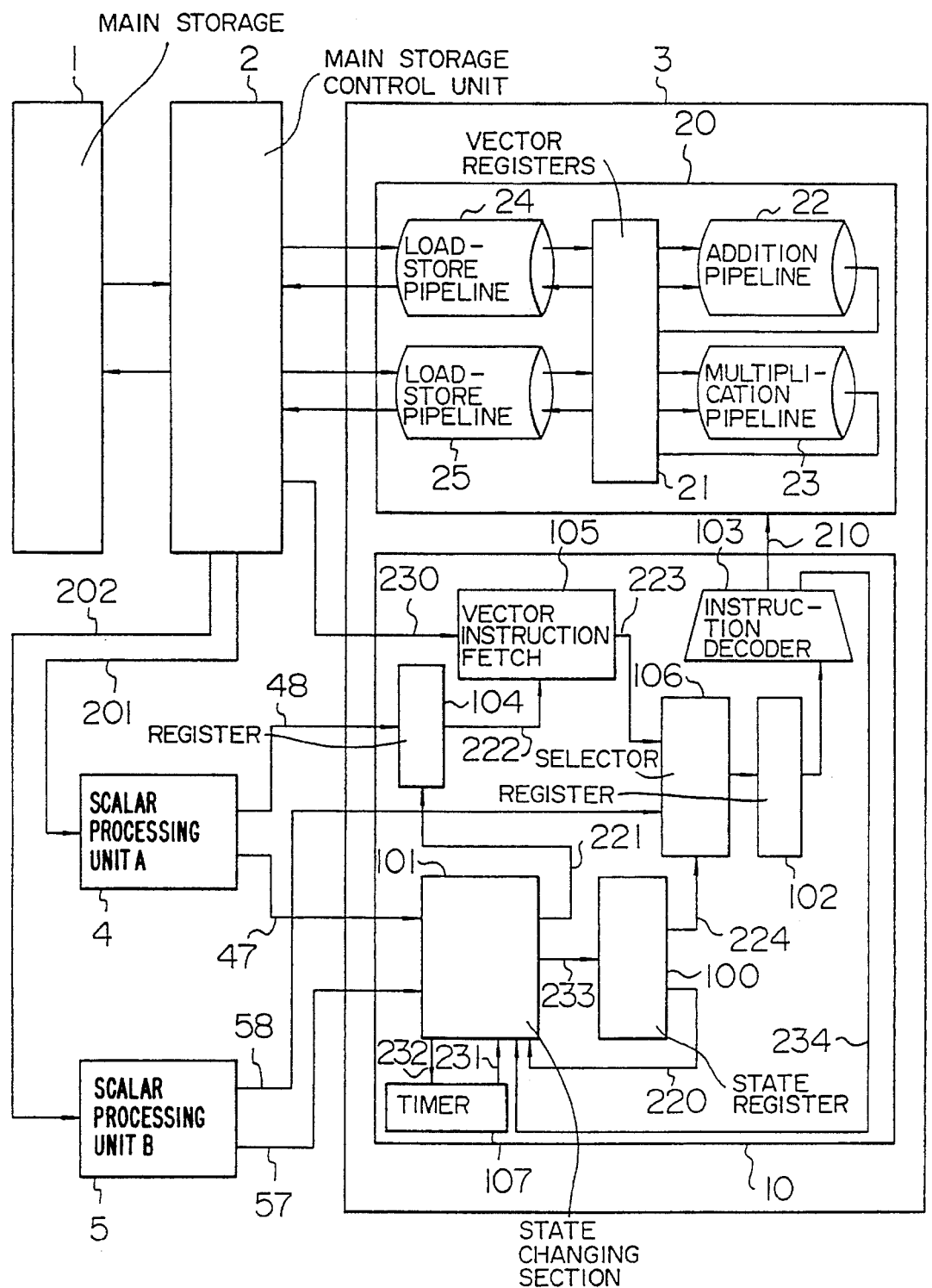

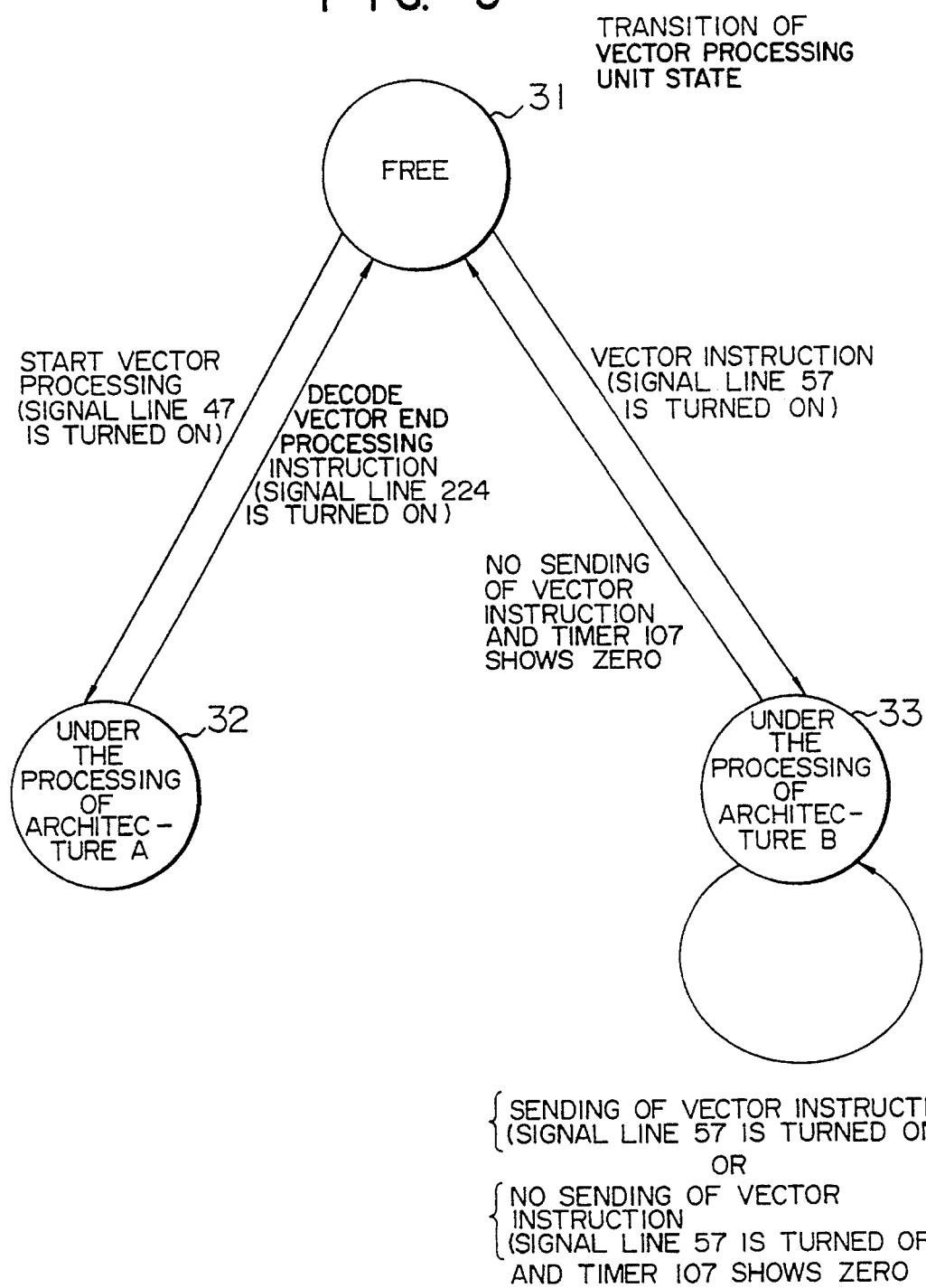

VECTOR PROCESSING APPARATUS FOR PROCESSING DIFFERENT INSTRUCTION SET ARCHITECTURES CORRESPONDING TO MINGLED-TYPE PROGRAMS AND SEPARATE-TYPE PROGRAMS

BACKGROUND OF THE INVENTION

The disclosures of U.S. Pat. Nos. 4,541,046, 4,617,625 and 4,128,880 and S. Kawabe, et al., "The Single-Vector-Engine Supercomputer S-820 Delivers", Nikkei Electronics, Nikkei-McGraw-Hill, Inc., Dec. 28, 1987 are related to the present application and incorporated herein by reference.

The present invention relates to a system which is capable of executing a program described or a load module compiled on the assumption of two or more different instruction set architectures in a vector processor type supercomputer for scientific and technical calculations configured of a scalar processing unit for processing a scalar instruction and a vector processing unit for processing a vector instruction.

The vector processor type supercomputer is utilized for the purpose of performing high-speed scientific and technical calculations. The representative vector processors are CRAY-1 developed by Cray Research, Ltd., VP-200 developed by Fujitsu, Ltd., VP-2000 series developed by Fujitsu, Ltd., and S-810 developed by Hitachi, Ltd. Those techniques concerned with the supercomputer are described in the following publications.

CRAY-1 developed by Cray Research, Ltd. is disclosed in JP-A-61-131169.

S-810 developed by Hitachi, Ltd. is disclosed in U.S. Pat. Nos. 4,541,046 and 4,617,625.

S-820 developed by Hitachi, LTd. is disclosed in the S-820 article.

In the above-mentioned instruction set architectures of a vector processor, that is, a logical structure of a computer defined by an instruction set consisting of a scalar instruction and a vector instruction, a register arrangement, and an I/O instruction interrupt, the scalar instruction is defined as one provided in a general-purpose computer and the vector instruction is defined as one for rapidly processing the calculations of arrays frequently taking place in scientific and technical calculations. The vector processor is configured to have a scalar processing unit for processing scalar instructions (referred to as an SPU) and a vector processing unit for processing vector instructions (referred to as a VPU).

The SPU and the VPU work in concert to process one program at high speed. The instruction fetch by the SPU and VPU can be, in large, divided into two types.

(1) In the architecture of a scalar instruction/vector instruction mingled type, the SPU fetches a scalar instruction as well as a vector instruction. If the vector instruction is fetched, the instruction is sent to the VPU for executing it therein. This type of vector processor is the foregoing CRAY-1, VP-200 or VP-2000 series, the latter two of which are developed by Fujitsu, Ltd.

(2) In the architecture of a scalar instruction/vector instruction separate type, when the SPU fetches an instruction for starting the vector processing and decodes it, the VPU is started. This type of vector processor is the foregoing S-810 or S-820 developed by Hitachi, Ltd. When the instruction for starting the CPU (an Execute Vector Processing Instruction, for short, an EXVP instruction as in S-810 or S-820) is decoded by the SPU, the information containing a location of a vector instruction stream specified as an operand of the instruction is sent to the VPU together with a vector processing start signal. The started VPU operates to fetch the vector instruction from a main storage or a buffer storage according to the starting information and execute it. When a series of vector processing steps are terminated, the termination is noticed.

The conventional supercomputer supports only one instruction set architecture and enables to process only one program described or compiled on the basis of the supported instruction set architecture.

Of the programs executable in the supercomputer, there exist many application programs such as a library for structure calculations, and these programs take an important role. Of these programs, a lot of programs are created on the instruction set architecture for a specific vector processor. Some are provided in the form of a load module described in a machine language.

When a user of a supercomputer wants to execute an application program in a supercomputer, the program cannot be executed therein if the program is written on a different instruction set architecture from that of the supercomputer. Considering that the program is provided in the form of a source program of the FORTRAN language tuned or optimized to the instruction set architecture of a certain supercomputer, if the program is executed in a supercomputer having another instruction set architecture, high speed or performance cannot be offered. With recent prevail of several types of supercomputers, some kinds of programs have been developed on respective computers. Hence, such a situation often takes place. Further, the supercomputer has been sequentially developed up to the new systems according to the progressing pace of the hardware technology development. The new techniques unknown in developing the old systems are included in the succeeding systems. This may result in impairing the compatibility of the architecture between the new and the old systems. In such a case, the software developed on the old systems cannot be often executed in the new systems.

From a viewpoint of estimating different instruction set architectures for the old and the new systems or the software fortune, the following system is considered for processing a plurality of instruction sets in one system.

That is, to build the system for processing the different architectures, the system is configured so that the vector processors are provided for respective architectures and are closely connected to one another through a main storage. This closely-connecting technique through the main storage may use a generally available multiprocessor configuration technique.

This system, however, has so expansive a scale of the system that the system configuration may lower feasibility. In actual, hence, such a system cannot be realized. As described above, the conventional vector processor cannot process only the software program written on the instruction set architecture proper to the processor itself. This type of vector processor, therefore, cannot properly execute a program developed on the different instruction set architecture from that of another vector processor and a program developed on the old system having no architectural compatibility with the new systems.

SUMMARY OF THE INVENTION

It is an object of the present invention to provide a vector processor type supercomputer supporting two or more different instruction set architectures which is allowed to be implemented in a far smaller apparatus scale by providing two processors for the different instruction set architectures.

It is a further object of the present invention to provide a system which is capable of processing some kinds of software programs developed on different vector architectures.

It is another object of the present invention to provide a system which includes a smaller number of vector processors than the number of supported architectures.

In general, the number of the elements in the SPU is considerably smaller than the number of the elements in the VPU. For the vector processing, the utilization rate of the VPU is not so high. Considering this fact, the arrangement of a dual scalar vector processor has been designed as shown in JP-A-61-131169. For example, for building a vector processor, two SPUs are provided to share one VPU so that the VPU may selectively accept a vector processing indication from the two SPUs and process two programs in a multiplexing manner. In this arrangement, each of the two SPUs is designed to process the same instruction set architecture.

According to the present invention, focusing on the foregoing two respects:

(a) The number of the elements in the SPU is far smaller than that in the VPU, and (b) The working rate of the VPU is not so high for the vector processing. To achieve the foregoing objects, a vector processor is configured to have at least two SPUs and at least one VPU having respective functions mentioned below.

That is, the vector processor provides a plurality of SPUs for processing scalar instructions in a plurality of supported different instruction set architectures and one or more VPUs shared by those SPUs. Each of the SPUs is allowed to correspond to each of the supported architectures. The number of VPUs is smaller than that of the SPUs. Each VPU has a function of processing various vector instructions belonging to the corresponding instruction set architecture.

In such a vector processor having the SPUs and the VPU(s), the VPU selectively accepts indications for executing vector processing or vector instructions sent out from the SPUs sharing the VPU itself and executes the vector processing. It means that the VPU makes it possible to be switchably dedicated to an instruction set architecture according to an indication sent from the SPU for the architecture or another instruction set architecture according to another indication sent from the SPU for another architecture. The processing of one program consists of a scalar processing step for executing a scalar instruction in the SPU and a vector processing step for executing a vector instruction in the VPU. In other words, when one program is completely executed from the start to the end, the VPU is never kept operative. As such, the sharing of the VPU by different SPUs does not lower the performance of the vector processor so much.

As described above, the vector processor according to the present invention is capable of supporting different instruction set architectures in a smaller amount of hardware without having to prepare a pair of SPU and VPU for each of the different instruction set architectures.

BRIEF DESCRIPTION OF THE DRAWINGS

FIG. 1 is a block diagram showing a vector processor system according to an embodiment of the present invention;

FIG. 5 is an explanatory view showing how a state changing unit changes a state in the embodiment shown in FIG. 1.

DESCRIPTION OF THE PREFERRED EMBODIMENT

Figure 2:
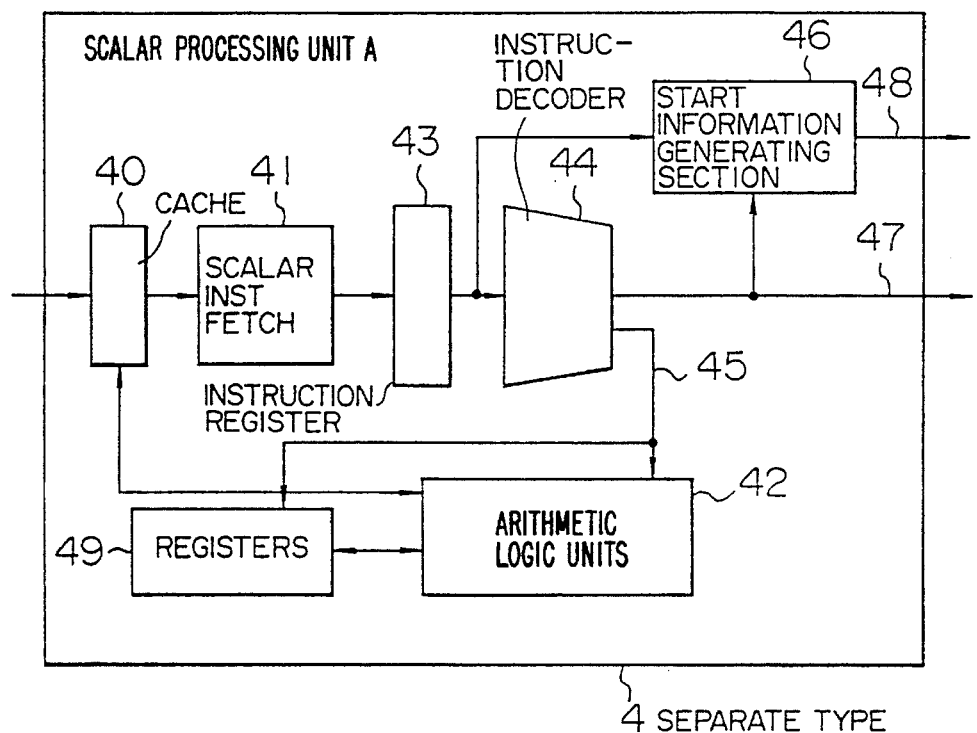
FIG. 2 is a scalar processing unit included in the vector processor system shown in FIG. 1, the unit for executing a scalar instruction and a vector processing of an instruction set architecture of a scalar instruction/vector instruction mingled type.

Herein, an embodiment of the present invention will be described later.

FIG. 1 is a block diagram showing a system of a vector processor type supercomputer according to an embodiment of the present invention. In this embodiment, the system is arranged to process two instruction set architectures, that is, one vector architecture of a scalar instruction/vector instruction separate type (which will be referred to as a vector architecture A) and the other vector architecture of a scalar instruction/vector instruction mingled type (which will be referred to as a vector architecture B). The vector architectures A and B may have respective scalar instructions and vector instructions which are different from each other.

The system according to this embodiment is configured to have a main storage 1, a main storage control unit 2, a vector processing unit (VPU) 3, and two scalar processing units 4 and 5. In the later description and the drawings, the scalar processing units 4 and 5 will be referred to as a SPU-A and a SPU-B, respectively. The main storage control unit 2 has a function of controlling a data transfer between the main storage 1 and the other components of the SPUs 4 and 5 and the VPU 3.

In the main storage 1, there are loaded a program described on the architecture A (referred to as a program a) and a program described on the architecture B (referred to as a program b). The program a is executed by the combination of the SPU-A 4 and the VPU 3 and the program b is executed by the combination of the SPU-B 5 and the VPU 3.

This system may process a selective one of the programs a and b or process these programs in parallel. The program is comprised of a vector instruction stream and a scalar instruction stream.

The scalar instruction stream and the vector instruction stream of the program a are fetched from the main storage 1 into the SPU-A 4 and the VPU 3, respectively. The program b is comprised of scalar and vector instruction stream which include scalar and vector instructions in a mixed manner. The instruction stream of the program b is fetched from the main storage 1 into the SPU-B 5. The SPU-A 4 and the SPU-B 5 may be concurrently executed in an independent manner so that the programs a and b may be processed in parallel. The SPU-A 4 is connected to the main storage control unit 2 through a signal line 201 so that an instruction or data may be transferred between the SPU-A 4 and the main storage control unit 2. Likewise, the SPU-B 5 is connected to the main storage control unit 2 through a signal line 202 so that an instruction or data may be transferred between the SPU-B 5 and the main storage control unit 2. In this embodiment, the vector architecture A which is the one adapted to S-810 developed by Hitachi, Ltd., is realized by the SPU-A 4 and the VPU 3 and the vector architecture B which is the one adapted to VP-200 developed by Fujitsu, Ltd., basically, is realized by the SPU-B 5 and the VPU 3.

The VPU 3 is configured to have a vector instruction control unit 10 and a vector instruction execution unit 20, which will be referred to as a VIU 10 and a VEU 20, respectively in the later description. The VEU 20 has vector registers (VRs) 21, an addition pipeline 22, a multiplication pipeline 23 and load-store pipelines 24, 25. The VEU 20 is required to process the vector instructions belonging to the vector architecture A and the vector instructions belonging to the vector architecture B. On the other hand, the VIU 10 serves to decode the vector instruction and sends a necessary signal to the VEU 20 for starting the execution of the instruction.

Turning to FIG. 2, the SPU-A 4 is shown for executing a scalar instruction stream which includes a preparation instruction and a vector processing start instruction. A vector processing start instruction which is called an EXVP instruction in the vector architecture A, is specific to the vector architecture A. There are provided a fetch circuit 41 for fetching the instruction, a cache 40 for holding a plurality of scalar instructions of the scalar instruction stream and data, an instruction register 43, and an instruction decoder 44. Each instruction of the scalar instruction stream is fetched from the cache 40 to the instruction register 43 by the fetch circuit 41. Then, the decoder 44 decodes the instruction held in the instruction register 43 and issues an operating indication to the ALUs 42 and registers 49 necessary for executing the instruction. The registers 49 hold data used by the ALUs and obtained by the ALUs. In FIG. 2, 46 is a start information generating section, which is operative when the EXVP instruction is executed. When the EXVP instruction is decoded, the decoder 44 provides a start signal on the signal line 47 and the start information generating section 46 sends (a) a head address of a vector instruction stream of the program a and (b) a vector length of the vector data to be processed both specified by the instruction on the signal line 48.

The start signal on the signal line 47 and the vector processing start information on the signal line 48 are sent to the VPU 3.

Referring to FIG. 1, in the VPU3, the register 104 receives the vector processing start information sent on the signal line 48 in response to a timing signal 221 which is generated in response to the start signal on the signal line 47 by the state changing section 101. The state changing section 101 provides, in response to the start signal on the line 47, a state register 100 via a signal line 233 with a first state signal which shows a state A in which the vector instruction of the architecture A is being processed. A vector instruction fetch section 105 sequentially fetches the vector instructions of the vector instruction stream of the program a from the main storage 1 in response to the head address of the vector instruction stream provided from the register 104 via a signal 222. The selector 106 selects each fetched vector instruction provided on a line 223 in response to the first state signal 224 provided from the state register 100. Thus, each fetched vector instruction is set to a vector instruction register 102. The instruction decoder 103 decodes the vector instruction in the vector instruction register 102 and determines whether or not one of the pipelines 22 to 25 and one of the vector registers 21 both required by the instruction are available. Then, the necessary information for the execution is transferred to the VEU 20 in which the instruction is executed. In a case that the decoded instruction is a VEND instruction indicating the termination of the vector processing, the stop of the vector instruction readout is indicated to the vector instruction fetch section 105 and the vector processing unit state holding section 101 is made inoperative.

The details about the operations of the foregoing sections have been described in U.S. Pat. Nos. 4,541,046 and 4,617,625.

Figure 3:
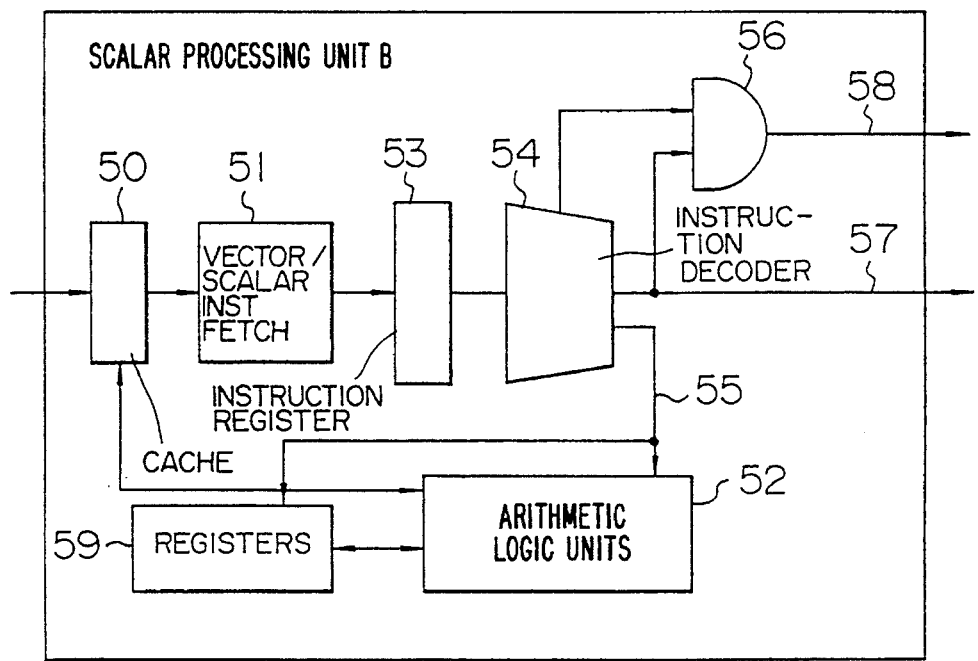
FIG. 3 is a scalar processing unit included in the vector processor system shown in FIG. 1, the unit for sending out a scalar instruction and a vector instruction of an instruction set architecture of a scalar instruction/vector instruction mingled type.

Turning to FIG. 3, the scalar processing unit (SPU-B) 5 is shown. The SPU-B 5 includes a cache 50, an instruction fetch circuit 51, ALUs 52, registers 59, an instruction register 53, and an instruction decoder 54. The cache holds a plurality of scalar and vector instructions of the scalar and vector instruction stream of the program b and data. Each instruction is fetched from the cache 50 to the instruction register 54.

The instruction decoder 54 decodes the instruction held in the register 53 and issues an operating indication 55 to the cache 50.

In a case that the instruction set in the instruction register 53 is a vector instruction, the decoder 54 provides a vector instruction sending signal on the signal line 57 and the signal opens the AND gate 56 and the vector instruction is transferred on the signal line 58.

The vector instruction sending signal on the line 57 and the vector instruction on the line 58 are sent to the VIU 10. In FIG. 1, the section 101 provides a second state signal 233 to the state register 100 in response to the vector instruction sending signal provided on the line 57. The signal 233 shows a state B in which a vector instruction of the architecture B is being processed. The selector 106 selects the vector instruction on the line 58 in response to the second state signal provided on the line 224 from the register 100. Thus, the vector register is set into a register 102, the vector instruction decoder 103 checks if one of the pipelines 22 to 25 and one of the vector registers 21 both required by the vector instruction are available. Then, the necessary information for the execution of the vector instruction is conveyed into the VEU 20 in which the vector instruction is executed.

The details about the operations of the foregoing circuit components have been described in U.S. Pat. No. 4,128,880.

In turn, the description will be directed to the system for processing vector instructions concerned with different vector architectures in the vector processing unit (VPU) 3 in accordance with an indication sent from the scalar processing unit (SPU-A) 4 or the scalar processing unit (SPU-B) 5.

The vector instruction control (VIU) 10 is intended to process vector instructions belonging to different vector architectures. The VIU 10 is configured as follows. As shown in FIG. 1, 100 is a VPU state register for holding the state of the VPU 3. 101 is a VPU state changing section for managing a current value (one of three kinds) indicating the state of the VPU 3 in accordance with the information sent from the SPU-A 4 or the SPU-B 5. 102 is a vector instruction register for holding a vector instruction. 103 is a vector instruction decode section for decoding the content of the vector instruction register 102, informing the vector instruction execution unit (VEU) 20 of the necessary information for executing the instruction through a signal line 210, and starting the execution of the instruction. 104 is a register, which serves as a vector processing start information holding section for holding the vector processing start information (mentioned above) coming from the SPU-A 4 through the signal line 48. 105 is a vector instruction fetch section, which serves as fetching a vector instruction from the main storage 1 based on the vector processing start information held in the register 104. 106 is a selecting circuit. 107 is a timer circuit.

Next, the description will be directed to the state of the VPU held in the VPU state register 100. The VPU 3 can keep the following three states.

(a) Free, that is, no vector instruction is executed.

(b) Architecture of a scalar instruction/vector instruction separate type, that is, the vector architecture A is under processing.

(c) Architecture of a scalar instruction/vector instruction mingled type, that is, the vector architecture B is under processing.

The software for the vector architecture A is not multiplexed with the software dedicated to the vector architecture B. The processing state of the vector architecture A does not take place when the vector architecture B is under processing. The transition among those three states is carried out as follows.

(a) When the state is free, it is possible to accept any one of the vector processing start signal (concerned with the vector architecture A) sent on the signal line 47 and the vector instruction sending signal (concerned with the vector architecture B) sent on the signal line 57. When the former signal is accepted, the transition is made to the state of under the processing of the vector architecture A.

(b) While the state is under the processing of vector architecture A, no new vector processing start signal 47 and vector instruction sending signal 57 are allowed to be accepted. When the vector processing is terminated, the transition is made to the free state.

(c) While the vector architecture B is being processed, no new vector processing start signal 47 is allowed to be accepted. However, the vector instruction sending signal 57 is allowed to be accepted along the processing flow of the vector instructions. During a predetermined period of time when no request for sending the vector instruction comes on the signal line 57, the transition is made to the free state.

The VPU state changing section 101 manages the state transition by using the vector processing start signal 47, the Vector instruction sending signal 57, and the value of the VPU state register 100 sent through the signal line 220. The updated state is reset to the VPU state register 100. 107 is a timer circuit which is used for monitoring that no vector instruction sending signal 57 comes during a predetermined time or more while the vector architecture B is under processing.

Figure 4:
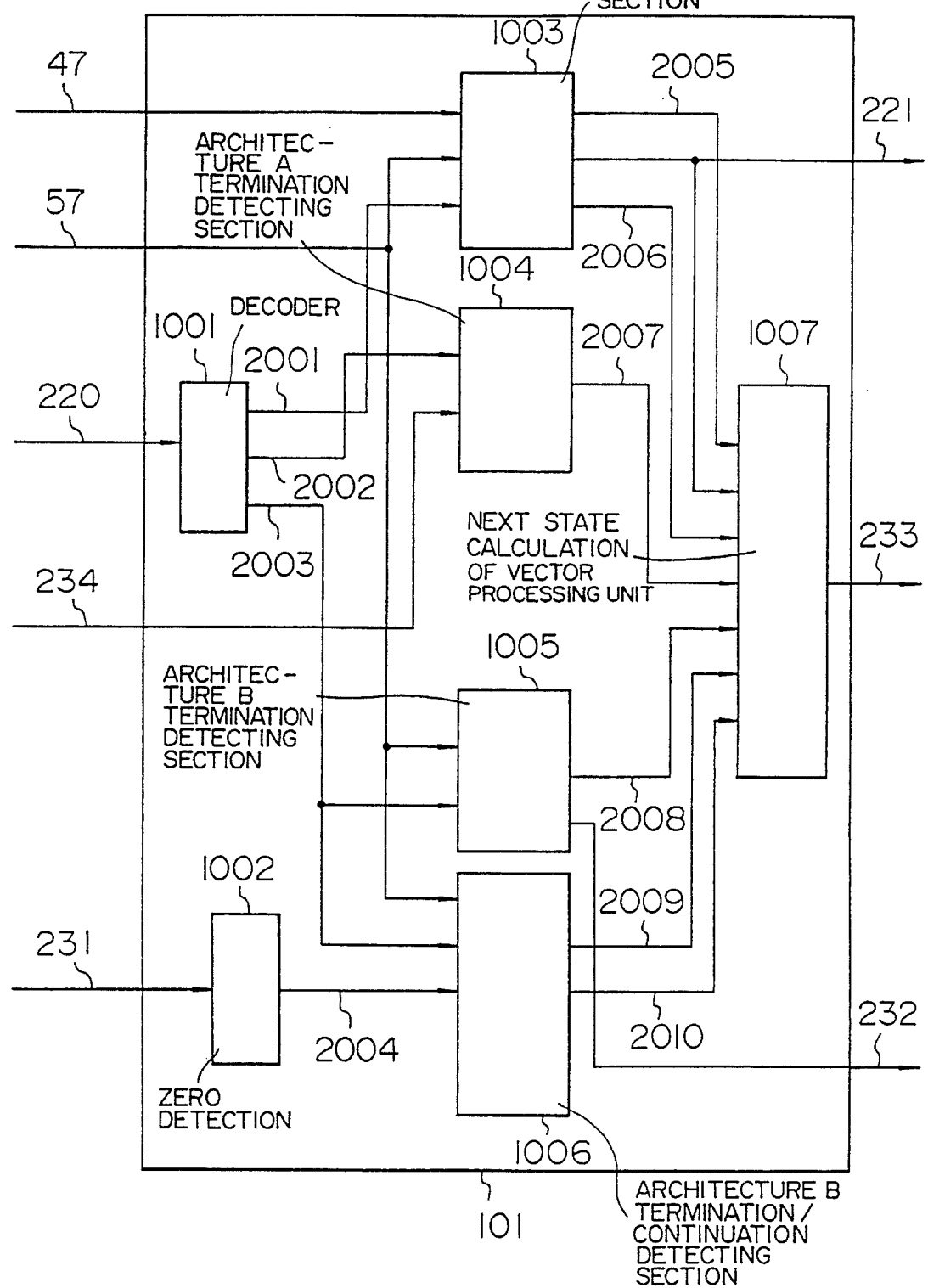
FIG. 4 is a block diagram showing the detail of a vector processing unit included in the embodiment shown in FIG. 1.

The operation of the VPU state changing section 101 will be described in more detail. FIG. 4 shows a partial arrangement of the VPU state changing section 101. The same components of FIG. 4 as those of FIG. 1 have the same reference numbers.

In FIG. 4, a signal on a signal line 231 is a signal for noticing a value of the timer 107 to the VPU state changing section 101, a signal on a signal line 232 is a start signal for the timer 107, and a signal on a signal line 233 is a signal for sending out a new VPU state value (free, under the processing of the architecture A, or under the processing of the architecture B) to be set to the VPU state register 100.

A signal on the signal line 234 is a signal for receiving a message from the decoder 103 when the VEND instruction for indicating the termination of the vector processing is decoded in the vector architecture A.

1001 is a decoder for the VPU state value 220. When the state is free, a signal line 2001 is turned on. While the state is under the processing of the vector architecture A, a signal line 2002 is turned on. While the state is under the processing of the vector architecture B" a signal line 2003 is turned on.

1002 is a zero detector, which serves to turn on a signal line 2004 when it detects the timer 107 indicates zero.

In turn, the description will be directed to the operations of a vector processing start detecting section 1003, a vector architecture A termination detecting section 1004, a vector architecture B continuation detecting section 1005, a vector architecture B termination/continuation detecting section 1006, and a VPU next state calculating section 1007 as referring to FIG. 5.

FIG. 5 is a state transition view showing the operation of the VPU state changing section 101. As mentioned above, the state may take three, that is, the free, under the processing of the architecture A, and under the processing of the architecture B.

In the free state 31, when the vector processing start signal 47 from the SPU-A is turned on, the transition is made to the state 32 of under the processing of the architecture A.

On the other hand, in the free state, when the vector instruction sending signal 57 is turned on, the transition is made to the state 33 of under the processing of the architecture B.

When the signal lines 47 and 57 are turned on at a time, it is necessary to define which of the lines is to be preceded. In this embodiment, the precedence is given to the signal line 47.

The above-mentioned serial processing steps are executed by the vector processing start detecting section 1003. When both of the signal lines 47 and 57 are switched off, the next state of the VPU is detected to be free, thereby allowing the signal line 2005 to be turned on. When the signal line 47 is turned on, the next state of the VPU is detected to be the state of under the processing of the architecture A, thereby allowing the signal line 221 to be turned on. When the next state of the VPU is detected to be the state of under the processing of the architecture B, the signal line 2006 is turned on.

While the VEND instruction indicating the termination of the vector processing is decoded under the processing of the architecture A, the next state of the VPU is detected to be free. This detection is carried out by the vector architecture A termination detecting section 1004. While the current state of the VPU is under the processing of the architecture A (the signal line 2002 remains on), if the VEND instruction decode notice comes from the signal line 234, the signal line 2007 is turned on by the vector architecture A termination detecting section 1004.

If the vector instruction sending signal 57 is turned on under the processing of the architecture B, it means an indication that the vector instruction of the architecture B is further processed under the processing of the architecture B. Hence, the next state of the VPU is detected to be under the processing of the architecture B. This detection is carried out by the vector architecture B detecting section 1005. When the signal line 57 is turned on and the current state of the VPU is detected to be under the processing of the architecture B (the signal line 2003 remains on), the signal line 2008 is turned on. Further, the start signal 232 for the timer 107 is turned on. As such, the timer 107 starts the countdown from a predetermined initial value (non-zero). If the vector instruction sending signal 57 is not turned on under the processing of the architecture B, the state transition is made as follows according to the value of the timer 107.

(a) When the timer 107 indicates a non-zero value,

The further signal 57 from the SPU-B is awaited. The next state of the VPU is under the processing of the vector instruction.

(b) When the timer 107 indicates zero, no indication for sending a vector instruction is issued for a predetermined time (from the initial value of the timer to zero). Hence, it is determined that no indication appears for a while after the passage of the predetermined time. The next state of the VPU is detected to be free.

The above-mentioned processing is carried out by the vector architecture B termination/continuation detecting section 1006. When the next state of the VPU is detected to be free, the signal line 2009 is turned on. When the architecture B is being processed, the signal line 2010 is turned on.

The signals on the signal lines 2005 to 2010 and 221 are applied to the VPU next state calculating section 1007 in which the next state of the VPU is determined and is sent out to the signal line 233.

As is apparent from the above-mentioned function of the VPU state changing section 101, it is possible to process a selective one of an indication for starting the vector processing from the SPU-A 4 to the VPU 3 and a request for sending and executing the vector instruction from the SPU-B 5 to the VPU 3.

In turn, the description will be directed to the operation of the vector instruction control unit (VIU) 10 the vector architecture A of a scalar instruction/vector instruction separate type is being processed.

If the vector processing start signal arrives through the signal line 47 when the VPU 3 is free, the VPU state changing section 101 sets the value of the VPU state register 100 while the vector architecture A is being processed. When the state of the VPU 3 is changed to the state of under the processing of the vector architecture A, the signal line 211 is turned on so that the vector processing start information sent through the signal line 48 may be set to the vector processing start information holding section, that is, the register 104. The information set to the register 104 is transmitted to the vector instruction fetch section 105 through the signal line 222. The section 105 serves to sequentially fetch the vector instruction from the main storage 1 through the signal line 230, based on the information transmitted on the signal line 222 and then send the vector instruction on the signal line 223. When the VPU state register 100 indicates the state of under the processing of the vector architecture A, the selecting circuit 106 selects the signal line 223 according to the indication sent on the signal line 224. Hence, the vector instruction register 102 serves to sequentially set the vector instructions fetched by the vector instruction fetch section 105. The vector instruction set to the vector instruction register 102 is decoded by the vector instruction decode section 103 so that the necessary information for execution may be sent to the VEU 20 through the signal line 210 for executing the vector instruction. When the decoded vector instruction is an instruction indicating an end of a vector instruction stream like the VEND (End of Vector Processing Instruction) instruction designed by Hitachi, Ltd, the later fetching of the vector instruction by the vector instruction fetch section 105 is terminated, resulting in setting the state of the VPU 3 to be free. This serial operation is analogous to the prior art and therefore is not illustrative.

Next, the description will be directed to the operation of the vector instruction control unit (VIU) 10 while the vector architecture B of a scalar instruction/vector instruction mingled type is being processed.

When the VPU 3 is free, if the vector instruction sending signal comes on the signal line 57, the VPU state changing section 101 serves to set the value of the VPU state register 100 to the state of under the processing of the vector architecture B. When the VPU state register 100 indicates the state of under the processing of the vector architecture B, the selecting circuit 106 selects the signal line 58 in accordance with an indication sent on the signal line 224. Hence, the vector instruction sent from the SPU-B 5 on the signal line 58 is set to the vector instruction register 102. The vector instruction set to the vector instruction register 102 is decoded by the vector instruction decode section 103 so that the necessary information for execution may be sent to the VEU 20 through the signal line 210 and executed. While the vector architecture B is being processed, the VIU 10 accepts a new vector instruction sending signal on the signal line 57 with the progress of the foregoing processing of the vector instruction. The VIU 10 continues to process a new vector instruction sent on the signal line 58 together with the vector instruction sending signal. While the vector architecture B is being processed, the timer circuit 107 is in operation. If the new vector instruction sending signal does not arrive through the signal line 57 after the passage of a predetermined time, the timer circuit 107 serves to issue an indication to the VPU state changing section 101 so as to set the VPU state register 100 free.

As described above, as shown in FIG. 1, the VPU 3 is configured to have two small-scale circuits added thereto, that is, the VPU state executing section 101 and the selecting circuit 106. According to this embodiment, for processing different vector processor architectures, that is, the scalar instruction/vector instruction separate type and the scalar instruction/vector instruction mingled type, no scalar processing and vector processing units are provided for these architectures, respectively in order to avoid the expansion of the device scale. On the other hand, a single processing unit is shared by the scalar processing units dedicated to these different architectures in order to implement the small scale device. In the vector processor, the vector processing unit is not continuously used but used only when the vector instruction is processed. Hence, the configuration according to this embodiment, that is, a single vector processing unit shared by two or more scalar processing units does not greatly lower the performance of the program for each of the architectures.

The foregoing description has been concerned with the configuration where two different vector architectures are supported by one vector processing unit shared by the two scalar processing units for these architectures. More different vector architectures to be supported do not become an obstacle to the essence of the invention. For example, to support three kinds of vector architectures to be supported, it is necessary to prepare at least three scalar processing units for these vector architectures and at least one vector processing unit having a vector instruction control unit for selecting processing the requests from these scalar processing units. According to this embodiment, the system configuration is intended for two different architectures, that is, the scalar instruction/vector instruction separate type and the scalar instruction/vector instruction mingled type. In actual, the present invention may apply to the combination of vector architectures of a scalar instruction/vector instruction separate type and another scalar instruction/vector instruction separate type or the combination of vector architectures of a scalar instruction/vector instruction mingled type and another scalar instruction/vector instruction mingled type.

What is claimed is:

1. A vector processor system comprising:
  (a) a main storage;
  (b) a first scalar processing unit connected to said main storage and having:
  (b1) a first fetch circuit for fetching a first instruction stream composed of scalar instructions belonging to a first program of a scalar instruction/vector instruction separate type having separated scalar instructions and vector instructions from said main storage, and
  (b2) a first scalar operation circuit for executing operations requested by said scalar instructions included in said first instruction stream fetched by said first fetch circuit,
  (c) a second scalar processing unit connected to said main storage and having:
  (c1) a second fetch circuit for fetching a second instruction stream composed of intermingled scalar instructions and vector instructions both belonging to a second program of a scalar instruction/vector instruction mingled type having intermingled scalar instructions and vector instructions from said main storage, said second fetch circuit having a decoder for detecting a vector instruction in said second instruction stream and outputting a detected vector instruction and information necessary for execution of said detected vector instruction,
  (c2) a second scalar operation circuit for executing an operation requested by two or more scalar instructions contained in said second instruction stream fetched by said second fetch circuit, and
  (d) a vector operation unit connected to said main storage and provided in common to said first and second scalar processing units,
  (e) a third fetch circuit connected to said first scalar processing unit for fetching a third instruction stream composed of vector instructions belonging to said first program of said scalar instruction/vector instruction separate type from said main storage in response to a predetermined scalar instruction within said first instruction stream which requires execution of said third instruction stream, and
  (f) a vector instruction control means connected with said third fetch circuit and said decoder of said second fetch circuit for selectively supplying said vector operation unit with one instruction stream of vector instructions contained in said third instruction stream fetched by said third fetch circuit from said main storage or said detected vector instruction of said second instruction stream from said second fetch circuit.

2. A vector processor system according to claim 1, further comprising:
  a state register for holding a state of either one of a first state representing that said vector operation unit is not executing a vector instruction of either one of said first and second programs, a second state representing that said vector processing unit is executing vector instructions of said first program, and a third state representing that said vector processing unit is executing vector instructions of said second program;
  a status value changing means connected to said state register, said first and second scalar processing units and said third fetch circuit and responsive to instructions fetched by said first and second scalar processing units and said third fetch circuit for changing a status value held by said state register; and
  a selection means responsive to said status value held in said state register for controlling execution of said vector operation unit.

3. A vector processor system according to claim 2, wherein said vector instruction control means includes a timer means connected to said status value changing means for detecting that a predetermined period has passed since said second scalar processing unit has ceased to supply a vector instruction to said vector instruction control means, and said status value changing means includes a means for changing a status value of said state register into said first state, in response to an output of said timer means.

4. A vector processing system according to claim 3, wherein said status value changing means is responsive to a vector instruction processing request from said first scalar processing unit for changing a status of said state register into said second state and responsive to an end instruction included in said third instruction stream for changing said second state into said first state.

5. A vector processing system according to claim 1, wherein said vector instruction control means includes:
  a detecting means responsive to instructions belonging to an instruction stream currently selected by said vector instruction control means for detecting an end of a currently selected said instruction stream, and a means for selecting another instruction stream in response to detection of said end.

6. A vector processing system according to claim 5, wherein said detecting means includes a means for detecting an end of said third instruction stream in response to a specific instruction indicative of said end.

7. A vector processing system according to claim 5, wherein said detecting means includes a means for detecting whether said second instruction stream should be treated as if it has reached an end, depending upon whether a predetermined time period has passed since said second scalar processing unit has ceased to supply vector instructions to said vector instruction control means.

8. A vector processing system according to claim 1, wherein said vector instruction control circuit includes a means responsive to an instruction currently supplied to said vector operation unit for determining whether vector instructions belonging to another instruction stream different from an instruction stream to which said currently supplied vector instruction belong should be supplied next.

9. A vector processing system according to claim 1, wherein said vector instruction control means includes a means for selecting one instruction stream from among said second and third instruction streams so that successive vector instructions belonging to a same instruction stream are selected successively.

10. A vector processing system according to claim 1, wherein said vector instruction control means includes a means responsive to fetched said second and third instruction streams for prohibiting supply of vector instructions belonging to one of said second and third instruction streams while vector instructions belonging to another of said second and third instruction streams are currently supplied to said vector operation unit.

11. A vector processor system for processing instructions belonging to at least two instruction sets of different instruction architectures, each set composed of scalar instructions and vector instructions, comprising:

a main storage storing two instruction sets, a first instruction set corresponding to a scalar instruction/vector instruction separate type program having separated scalar instructions and vector instructions, and a second instruction set corresponding to a scalar instruction/vector instruction mingled type program having intermingled scalar instructions and vector instructions;

at least two scalar processing units, each provided in correspondence to one of said first and second instruction sets, for fetching one of said first and second instruction sets, respectively and for processing scalar instructions belonging to a corresponding one of said first and second instruction sets; and a vector processing unit for fetching a vector instruction stream of said scalar instruction/vector instruction separate type program and receiving vector instructions of said scalar instruction/vector instruction mingled type program, said vector processing unit being provided in common to said at least two scalar processing units, for executing vector instructions belonging to said first and second instruction sets, and comprises a selecting means connected to said at least two scalar processing units for selecting one of said first and second instruction sets in response to vector instruction processing requests each provided from one of said scalar processing units such that said selecting means selects vector instructions from one of said at least two scalar processing units when a vector instruction processing request corresponds to a scalar instruction/vector instruction mingled type program, and fetches vector instructions from said main storage when a vector instruction processing request corresponds to a scalar instruction/vector instruction separate type program, and a means for processing vector instructions belonging to a selected instruction set.

12. A vector processing system according to claim 11, wherein said selecting means includes means responsive to instructions belonging to an instruction set currently selected by said selecting means for determining whether vector instructions belonging to another instruction set is to be selected next.

* * * * *